(12) United States Patent
Tung et al.

(10) Patent No.: US 8,671,235 B2
(45) Date of Patent: Mar. 11, 2014

(54) KVM SWITCH WITH EMBEDDED BLUETOOTH MODULE

(75) Inventors: Shu-Ching Tung, Shijr (TW); Ping-Wen Tsai, Shijr (TW); Hsiang-Jui Yu, Shijr (TW); Chao-Hsuan Hsueh, Shijr (TW)

(73) Assignee: Aten International Co., Ltd., Shijr (TW)

( * ) Notice: Subject to any disclaimer, the term of this patent is extended or adjusted under 35 U.S.C. 154(b) by 146 days.

(21) Appl. No.: 13/193,404

(22) Filed: Jul. 28, 2011

(65) Prior Publication Data

US 2012/0284449 A1 Nov. 8, 2012

Related U.S. Application Data

(60) Provisional application No. 61/482,854, filed on May 5, 2011.

(51) Int. Cl.
*G06F 13/12* (2006.01)
*G06F 5/00* (2006.01)
*G06F 13/14* (2006.01)

(52) U.S. Cl.
USPC .................. 710/62; 710/5; 710/305

(58) Field of Classification Search
None
See application file for complete search history.

(56) References Cited

U.S. PATENT DOCUMENTS

| | | | |
|---|---|---|---|
| 7,155,163 B2 * | 12/2006 | Cannon et al. | 455/41.2 |
| 7,423,999 B2 | 9/2008 | Tailor | |
| 7,735,739 B1 | 6/2010 | Brandon et al. | |
| 7,813,762 B2 | 10/2010 | Sanguino et al. | |
| 2004/0162108 A1 | 8/2004 | Fu et al. | |
| 2005/0204026 A1 | 9/2005 | Hoerl | |
| 2005/0231462 A1 * | 10/2005 | Chen | 345/156 |
| 2006/0007151 A1 | 1/2006 | Ram | |

(Continued)

FOREIGN PATENT DOCUMENTS

| | | |
|---|---|---|
| CN | 2812102 | 8/2006 |
| CN | 201365241 | 12/2009 |

(Continued)

OTHER PUBLICATIONS

Kensington Computer Products Group, "Kensington Bluetooth USB Micro Adapter, Model number: K33902", http://us.kensington.com/html/14409.html, 1 page, printed from the Internet on Jul. 21, 2011.

(Continued)

*Primary Examiner* — Idriss N Alrobaye
*Assistant Examiner* — David Martinez
(74) *Attorney, Agent, or Firm* — Chen Yoshimura LLP

(57) ABSTRACT

A switch device that allows a user to use the same non-Bluetooth user console (e.g., keyboard, mouse) to control both non-Bluetooth computers and Bluetooth master machines such as tablet computers, smart phones, etc. The switch device includes a console port for connecting to the console and one or more computer ports for connecting to one or more computers, as well as a Bluetooth module for communicating with Bluetooth master machines. A controller processes input device data received via the console port, and either sends the data to a selected Bluetooth master machine or a selected computer, or perform other functions such as switching, Bluetooth device pairing and disconnecting based on the input device data. The controller stores link information of the Bluetooth master machines already paired with the computer switch for quickly switching to a Bluetooth master machine. The switch device can be with or without video switching.

23 Claims, 4 Drawing Sheets

(56) References Cited

U.S. PATENT DOCUMENTS

| | | | |
|---|---|---|---|
| 2007/0028018 | A1 | 2/2007 | Giroud et al. |
| 2007/0208891 | A1 | 9/2007 | Liu |
| 2008/0036741 | A1 | 2/2008 | Hsieh et al. |
| 2008/0129692 | A1* | 6/2008 | Sween et al. ............... 345/157 |
| 2008/0222326 | A1* | 9/2008 | Liu et al. .................... 710/62 |
| 2009/0303926 | A1 | 12/2009 | Den Hartog et al. |
| 2009/0319909 | A1 | 12/2009 | Hsueh et al. |
| 2010/0100652 | A1 | 4/2010 | Lin et al. |
| 2011/0063211 | A1* | 3/2011 | Hoerl et al. ................ 345/157 |
| 2012/0123670 | A1* | 5/2012 | Uyeki ......................... 701/300 |

FOREIGN PATENT DOCUMENTS

| | | |
|---|---|---|
| JP | H05-265625 | 10/1993 |
| JP | H09-128111 | 5/1997 |
| JP | 2000-276269 | 10/2000 |
| JP | 2007-538419 | 12/2007 |
| JP | 3155578 | 11/2009 |
| JP | 2010-102682 | 5/2010 |
| JP | 2011-022639 | 2/2011 |

OTHER PUBLICATIONS

Centre for Global eHealth Innovation, University Health Network, "Bluetooth/USB Adapter for Medical Devices", http://www.ehealthinnovation.org/?q=mdi_bt_adapter, 1 page, printed from the Internet on Jul. 26, 2011.

Brainboxes Limited, "BL-819, RS232 Bluetooth adapters (DTE)", http://www.tekgear.com/index.cfm?pageID=90&prodid=461&section=73, 1 page, printed from the Internet on Jul. 26, 2011.

Iogear, "GBS301, Serial Adapter with Bluetooth wireless technology", http://www.iogear.com/product/GBS301/, 1 page, printed from the Internet on Jul. 26, 2011.

Electronic Keyboards, Inc., "RS-232, RS-422 and Parallel Output Keyboards from EKI" http://www.electronickeyboards.com/rs232-keyboard.html, 5 pages, printed from the Internet on Jul. 26, 2011.

GIGA-TMS Inc., "RS232 to Keyboard PS2 Converter" http://giga.manufacturer.globalsources.com/si/6008800566062/pdtl/LAN-card/1003303313/RS232-to-Keyboard-PS2-Converter.htm, 3 pages, printed from the Internet on Jul. 26, 2011.

Iogear, "GBP302KIT, Wireless Combo Print Adapter Kit", http://www.iogear.com/product/GBP302KIT/, 1 page, printed from the Internet on Jul. 26, 2011.

Iogear, "GBP201, USB Print Adapter w/Bluetooth Wireless Technology", http://www.iogear.com/product/GBP201/, 1 page, printed from Internet on Jul. 26, 2011.

Zonet USA Corporation, "4-Port USB KVM Switch w/ Audio and Bluetooth, KVM3324W", http://www.zonetusa.com/products-113.aspx, 1 page, printed from the Internet on Jul. 26, 2011.

Apple Inc., Apple Support Communities, Discussions, "Topic: Bluetooth-capable KVM switch?", https://discussions.apple.com/message/12998669?messageID=12998669#12998669?messageID=12998669 1 page, printed from the Internet on Jul. 26, 2011.

Zonet USA Corporation, "2 Ports USB KVM Switch w/Audio + Bluetooth, Model# KVM3322W, Installation Guide", unknown date, City of Industry, CA.

Japanese Office Action, dated May 28, 2013, in a counterpart Japanese patent application, No. JP 2012-039307.

Japanese Office Action, dated Sep. 17, 2013, in a counterpart Japanese patent application, No. JP 2012-039307.

* cited by examiner

KVM SWITCH WITH EMBEDDED BLUETOOTH MODULE

This application claims priority under 35 USC §119(e) from U.S. Provisional Patent Application No. 61/482,854, filed May 5, 2011, which is herein incorporated by reference in its entirety.

BACKGROUND OF THE INVENTION

1. Field of the Invention

This invention relates to a switch for computer equipment, and in particular, it relates to such a switch having embedded Bluetooth module that allows a non-Bluetooth enabled user console to input data for Bluetooth master machines.

2. Description of the Related Art

A keyboard, video, mouse (KVM) switch is a hardware device that can be connected to multiple computers and one or more user consoles, such that each user console may be selectively switched to control any one of the computers. Each user console typically includes a display device (monitor) and user input devices such as a keyboard and a mouse, as well as other devices such as speakers. When a user console is connected to a selected computer by the KVM switch, the video signals generated by the selected computer is transmitted by the KVM switch to the user console and displayed on its monitor, and user input signals generated by the keyboard and mouse of the user console are transmitted by the KVM switch to the selected computer to control it. Thus, the user console can communicate with the selected computer as if the user console is directly connected to that computer. In addition to communicating with the selected computer, the user console can communicate with and control the KVM switch. For example, the user using the user console can log on to the KVM switch, change the settings of the KVM switch, select one of the multiple computers to control, etc. The KVM switch may implement an on-screen display (OSD) system to assist the user in communicating with the KVM switch. The OSD system generates images such as menus for display on the monitor of the user console, and the user uses the keyboard or mouse to generate input signals for the KVM switch in response to the OSD display.

Bluetooth is a wireless communication technology that enables Bluetooth devices to communicate with each other over short distances using short wavelength radio transmission. When two Bluetooth devices communicate with each other, one device is a master and the other is a slave. Each master can communicate with up to seven slaves in a piconet; typically, the master communicates with one slave device at any given time. Many types of Bluetooth enabled devices have been developed, such as mobile phones, computers, printers (especially tablet computers), digital cameras, keyboard and mouse, game consoles, etc.

For example, Bluetooth keyboards (as slaves) are popular devices uses with tablet computers (as masters) such as iPad™ which do not have their own mechanical keyboards. While tablet computers and smart handheld devices have become more popular and are equipped with more advanced functions so that they can almost achieve the functions of notebook or desktop computers, because these products use touch screen as user input interface, it is not very convenient for the user to input text. Bluetooth keyboards have been used as text input device for convenience. Accordingly, many users use an external Bluetooth keyboard for such computers.

Bluetooth adapters are also available to allow a non-Bluetooth enabled devices to communicate with Bluetooth devices. For example, a widely available type of Bluetooth adapter is in the form of a dongle plugged into a computer's USB port. Stand-alone Bluetooth adapters for computer peripherals have also been proposed, such as that described in US Patent Application Publication No. 2007/0028018. As described in this application, a "conventional master computer equipment" can be connected to a "USB Bluetooth peripheral type adapter" to communicate with Bluetooth devices, and a "conventional peripheral computer equipment" can be connected to a "USB Bluetooth master type adapter" to communicate with Bluetooth devices.

KVM switches with embedded Bluetooth modules have also been available. One such device is the "2 Ports USB KVM Switch w/Audio+Bluetooth, Model #KVM3322W" made by Zonet. This KVM has a Bluetooth antenna, and allows the computers connected to the switch to communicate with Bluetooth devices such as Bluetooth enabled computers, via the KVM switch. A Bluetooth driver is required to be installed on the computers (which are themselves non-Bluetooth enabled).

SUMMARY OF THE INVENTION

The present invention is directed to a computer switch, such as a KVM switch, which allows a user to use the same non-Bluetooth enabled user console device to control Bluetooth master machines via the KVM switch in the same manner as controlling conventional computers directly connected to the KVM switch.

An object of the present invention is to provide a more versatile computer switch system for selectively controlling multiple computers.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a switch device for communications between a user console and one or more computers and one or more WPAN (wireless personal area network) devices, the user console including one or more user input devices and a monitor, the switch device including: a console interface for connecting to the user console, including a first input device connector for connecting to the user input devices of the user console and a first video connector for connecting to the monitor of the user console; a computer interface including one or more computer ports for connecting to the one or more computers, respectively, each computer port including a second input device connector and a second video connector; a wireless interface for wireless communication with the one or more WPAN devices using a predefined wireless communication technology; a controller coupled to the console interface, the computer interface and the wireless interface, wherein in response to a first selection command selecting one of the one or more computer ports, the controller transmits input device data from the first input device connector of the console interface to the second input device connector of a selected one of the one or more computer ports, whereby the input device data controls the computer connected to the selected computer port, and wherein in response to a second selection command selecting one of the one or more WPAN devices, the controller converts input device data received from the first input device connector of the console interface into data compliant with the predefined wireless communication standard, and transmits the converted data to the wireless interface, whereby the input device data controls the selected one of the one or more WPAN devices; and a video switch coupled to the computer interface and the console interface, wherein in response to the first selection command, the video switch transmits video data from the second video connector of the selected one of the one or more computer ports to the first video connector of the console interface, whereby video signals from the computer connected to the selected computer port is displayed on the monitor of the user console.

In another aspect, the present invention provides a switch device for communications between a user input device and a computer and one or more WPAN (wireless personal area network) devices, the switch device including: a console interface including a first input device connector for connecting to the user input device; a computer interface including a second input device connector for connecting to an input device connector of a computer; a wireless interface for wireless communication with the one or more WPAN devices using a predefined wireless communication technology; and a controller coupled to the console interface, the computer interface and the wireless interface, wherein in response to a first selection command selecting the computer interface, the controller transmits input device data from the first input device connector to the second input device connector, whereby the input device data controls the computer connected to the second input device connector, and wherein in response to a second selection command selecting one of the one or more WPAN devices, the controller converts input device data received from the first input device connector of the console interface into data compliant with the predefined wireless communication standard, and transmits the converted data to the wireless interface, whereby the input device data controls the selected one of the one or more WPAN devices.

In another aspect, the present invention provides a method for sharing a user input device of a user console among one or more computers and one or more WPAN (wireless personal area network) devices, including: providing a switch device having a console interface, a computer interface including one or more computer ports, and a wireless interface for wireless communication with the one or more WPAN devices using a predefined wireless communication technology; connecting the user input device to the first input device connector of the switch device; connecting the one or more computers to the one or more computer ports of the switch device, respectively; pairing the switch device with the one or more WPAN devices; in response to a first selection command selecting one of the one or more computer ports, the switch device transmitting input device data from the console interface to the selected one of the one or more computer ports, whereby the input device data controls the computer connected to the selected computer port; and in response to a second selection command selecting one of the one or more WPAN devices, the switch device converting input device data received from the console interface into data compliant with the predefined wireless communication standard, and transmitting the converted data to the wireless interface, whereby the input device data controls the selected one of the one or more WPAN devices.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems, operating structures and methods in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the embodiments of the present invention.

Embodiments of the present invention provide a switch device, such as a KVM switch, with embedded Bluetooth module that converts data signals from console-side input devices (including keyboard, mouse, joystick, gamepad, speakers, etc.) into Bluetooth compliant signals, and provide the Bluetooth signals to products that support Bluetooth, such as tablet computers, smart handheld devices, notebook computers, PC, game devices, etc. This way, the switch device is used to adapt non-Bluetooth keyboards for use with Bluetooth devices (referred to as Bluetooth master machines in this disclosure) to provide enhanced, more convenient text input functions. Using the KVM switch, the same non-Bluetooth keyboard can be shared by non-Bluetooth computers and Bluetooth enabled devices (Bluetooth master machines) without additional hardware.

Figure 1:
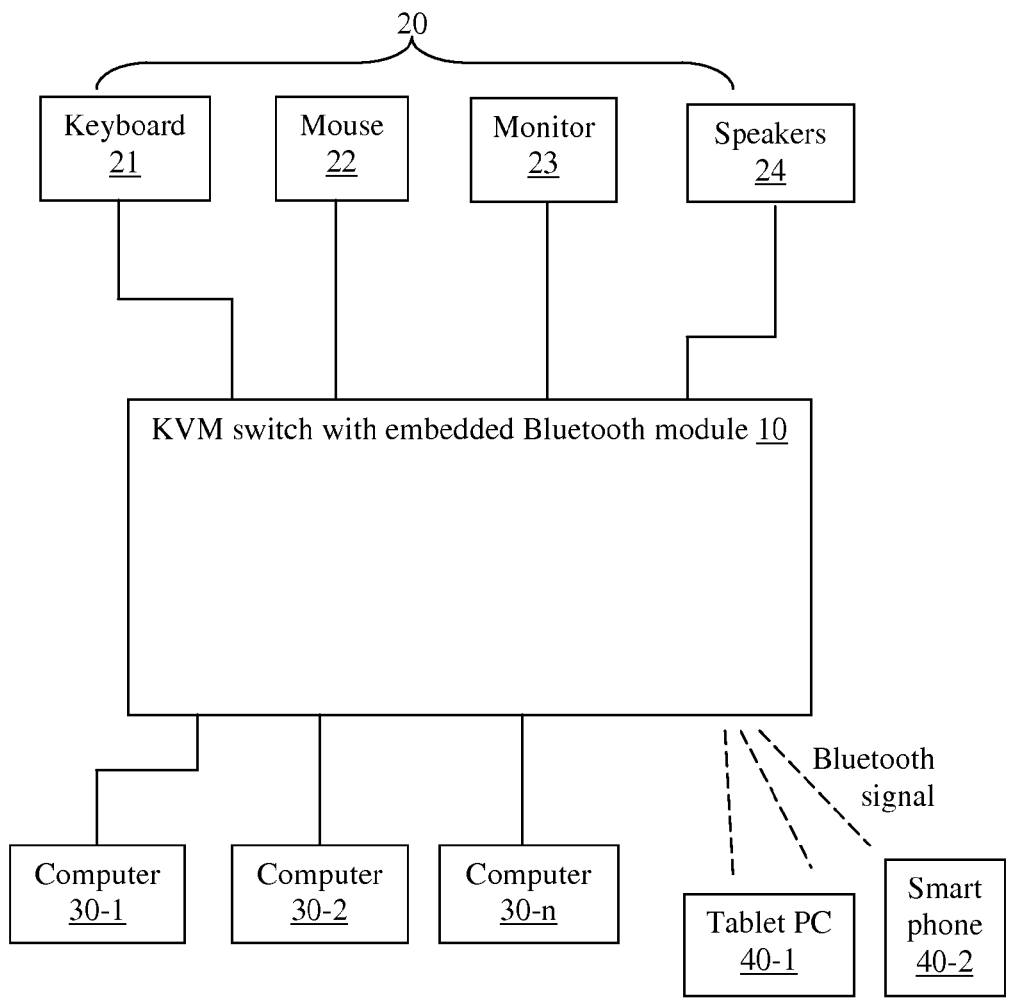
FIG. 1 illustrates a KVM switch system according to a first embodiment of the present invention.

FIG. 1 illustrates a KVM switch system according to a first embodiment of the present invention. The system includes a KVM switch 10 which has an embedded Bluetooth module described in more detail later. A user console 20 including a keyboard 21, a mouse 22, a monitor 23, and (optionally) speakers 24 is connected to the KVM switch 10 by cables. The keyboard 21 and mouse 22 may be collectively referred to as user input devices. Other user input devices such as joystick, gamepad, etc. may also be used. The connections between the KVM switch 10 and the keyboard 21/mouse 22 may include PS/2 or USB connection. The connections between the KVM switch 10 and the monitor 23 may be VGA or other suitable video connections. Although only one user console 20 is shown, a KVM (sometimes referred to as a matrix KVM) can be connected to multiple user consoles.

A plurality of computers 30-1 to 30-n are connected to the KVM switch 10. The computers 30-1 to 30-n may be non-Bluetooth enabled computers. The connections between the KVM switch 10 and each computer 30-1 to 30-n may include a USB or PS/2 connection for keyboard and mouse signals, and VGA or other suitable video connections for video signals. The KVM switch 10 allows a user at the user console 20 to selectively control one of the computers 30-1 to 30-n using the keyboard/mouse and the monitor.

In addition, the Bluetooth module within the KVM switch 10 allows the KVM switch to communicate with Bluetooth enabled devices (Bluetooth master machines) such as tablet computer 40-1, smart phone 40-2, smart handheld devices, game devices, Bluetooth enabled notebook and desktop computers, etc. using Bluetooth signals. These are devices that support Bluetooth keyboard or other data input. Up to seven Bluetooth master machines may communicate with the KVM switch. Via the KVM switch 10, a user at the user console 20 can control a selected one of the Bluetooth master machines 40-1, 40-2 etc. as if that device were connected to the KVM switch by a wired connection. The KVM switch 10 can switch seamlessly among the non-Bluetooth enabled computers 30-1, 30-2, etc. and the Bluetooth master machines 40-1, 40-2, etc.

Figure 2:
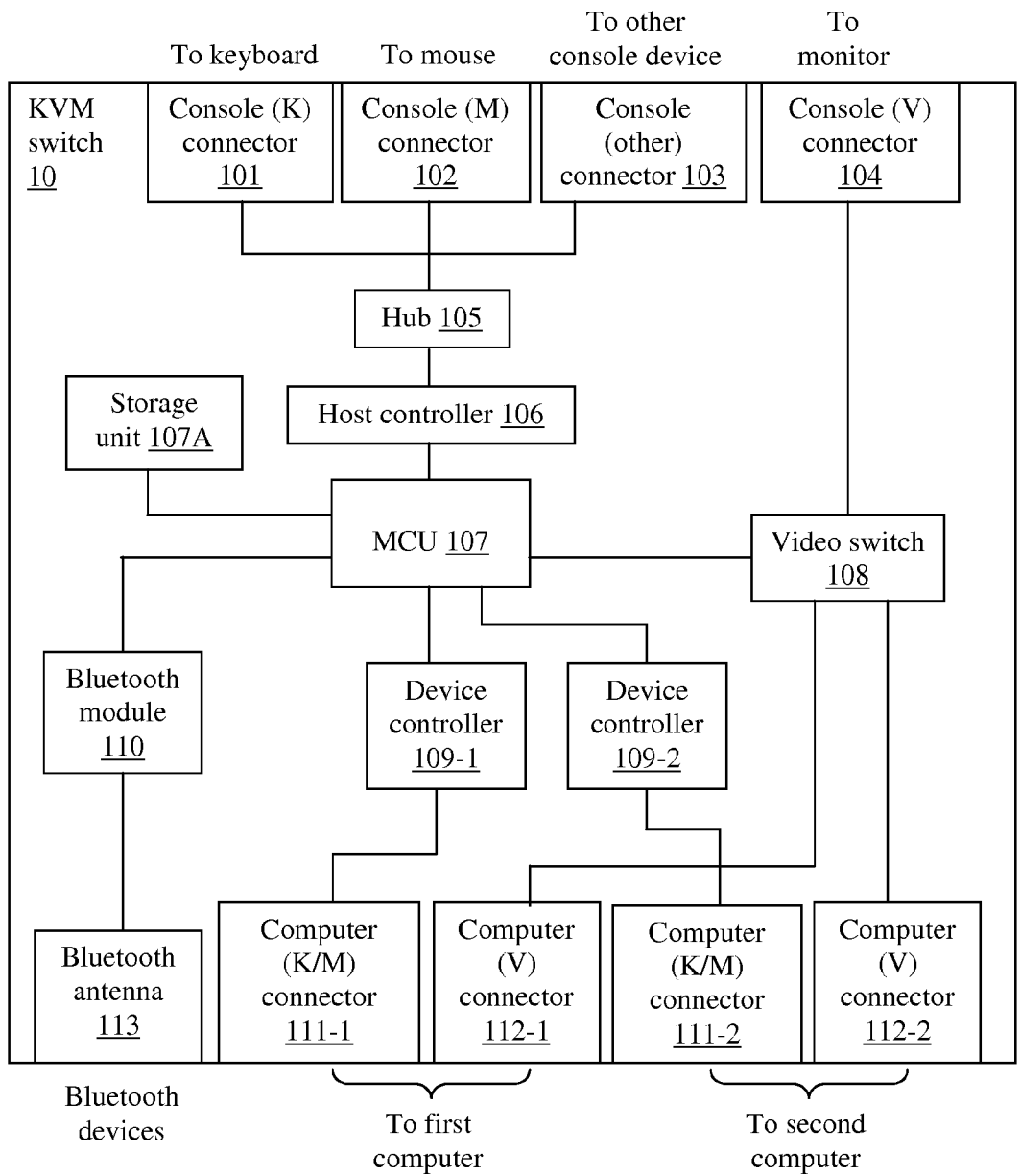
FIG. 2 is a block diagram illustrating a structure of the KVM switch of the first embodiment.

FIG. 2 is a block diagram illustrating a structure of the KVM switch 10 of FIG. 1. The KVM switch 10 has a console port (or console interface) including a keyboard connector 101, a mouse connector 102, a video connector 104, and a connector 103 for other console devices such as speakers. In the illustrated embodiment, the connectors 101 to 103 use USB connections, but other types of connections such as PS/2 may be used for the keyboard/mouse and other console devices. While the keyboard and mouse connectors are shown as separate connectors in this example, the KVM switch 10 may also use one USB connector for both keyboard and mouse signals.

On the computer side, the KVM switch 10 has a first computer port including an input device (keyboard/mouse) connector 111-1 and video connector 112-1 for a connecting with a first computer, and a second computer port including an input device (keyboard/mouse) connector 111-2 and video connector 112-2 for a connecting with a second computer. Alternatively, each computer port may have separate keyboard and mouse connectors. In this example, the keyboard and mouse connectors 111-1 and 111-2 use USB connections, but other types of connections such as PS/2 may be used. The video connector 112-1 and 112-2 may uses a VGA or other suitable connections. Although only two computer ports are shown, more may be provided. The multiple computer ports may be collectively referred to as the computer interface.

The hub 105 is a USB hub in this example. The console connectors 101 to 103 are connected at the downstream end of the hub 105, and a host controller 106 (USB host controller in this example) is connected to the upstream end of the hub. The hub 105 enables the host controller 106 to communicate with multiple USB devices (keyboard, mouse, and other devices). The hub may be omitted, for example if an external hub is used. The host controller 106 is connected to a controller such as an MCU (microcontroller unit) 107 which will be described in more detail later. A storage unit 107A connected to the MCU 107 stores various data for the operation of the MCU, or pairing information and link information for Bluetooth master machines as will be described in more detail later.

A video switch 108 is connected between the console video connector 104 and the multiple computer video connectors 112-1 and 112-2. The video switch 108 is connected to and receives control signals from the MCU 107. Under the control of the MCU 107, the video switch 108 selectively transmits video signals from either the first computer (via computer video connector 112-1) or the second computer (via computer video connector 112-2) to the console monitor (via console video connector 104). As a result, the desktop image from the selected computer is displayed on the console monitor.

Multiple (two are shown here) device controllers 109-1 and 109-2 and a Bluetooth module 110 are connected to the MCU 107. The device controllers 109-1 and 109-2, which are USB device controllers in this example, are connected to the respective computer keyboard/mouse connectors 111-1 and 111-2. The device controllers 109-1 and 109-2 communicate input device data with the respective computers. For example, each device controller 109-1 or 109-2 can emulate a keyboard and/or a mouse to the respective computer.

The Bluetooth module 110 is a controller that converts input device data (e.g. keyboard and/or mouse data) from one format (e.g. USB) to a format that comply with the Bluetooth standard. It also contains a transceiver for communicating the data to Bluetooth master machines via the Bluetooth antenna 113. The Bluetooth module 110 acts as a Bluetooth slave with respect to the Bluetooth master machines. The Bluetooth module may simulate a Bluetooth HID (Human Interface Device) such as a keyboard and/or mouse to the Bluetooth master machine.

The communication between the MCU 107 and the Bluetooth module 110 can use any appropriate format and hardware, such as UART, $I^2C$ bus, SPIC, etc. The signals between the MCU 107 and the Bluetooth module 110 are bi-directional: In addition to the input device data being sent from the MCU to the Bluetooth module, the Bluetooth module may transmit certain signals (such as Caps Lock indicator signals) from the Bluetooth master machine to the MCU. Such signals may be further transmitted to the keyboard so that appropriate indicator lights on the keyboard may be illuminated.

Figure 3:
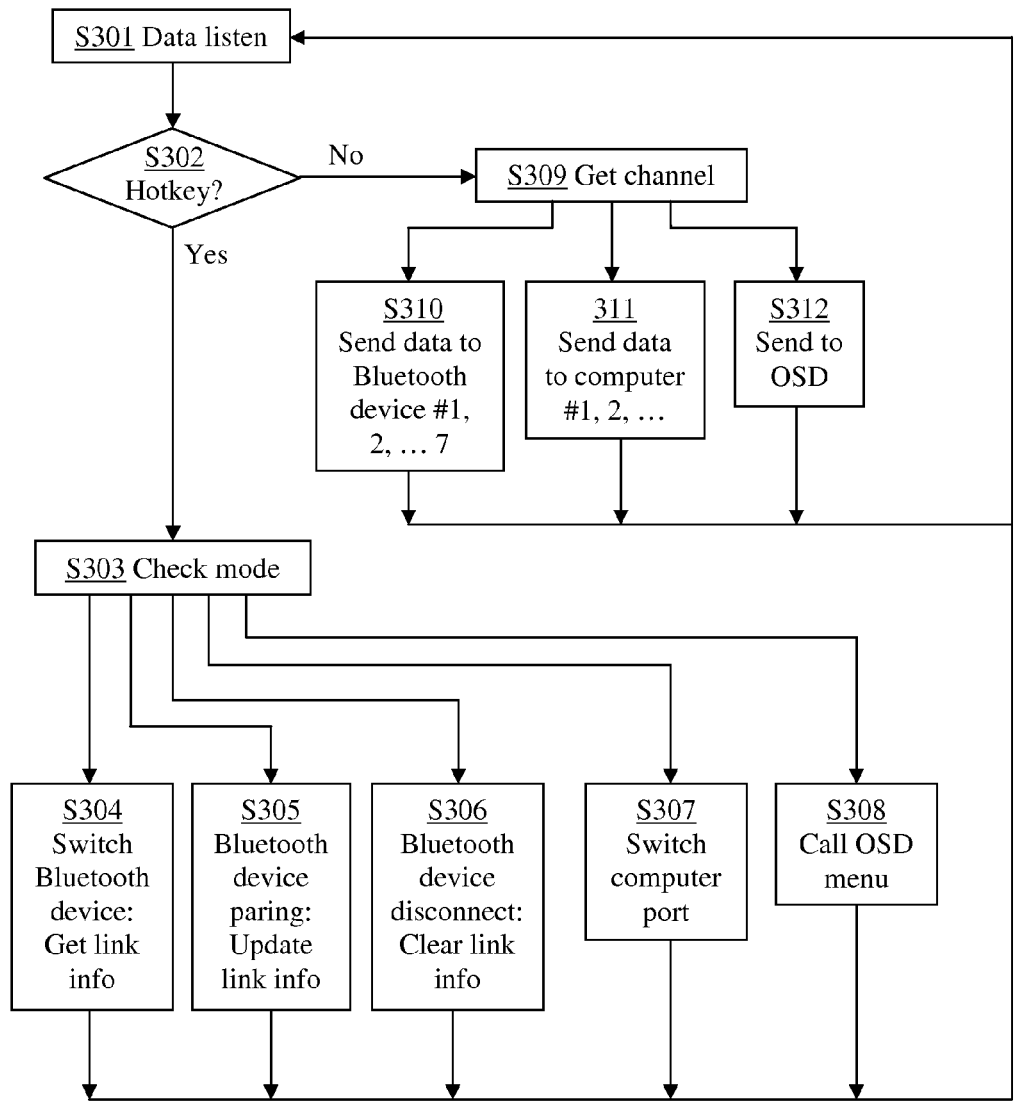
FIG. 3 illustrates an operation of the KVM switch of the first embodiment.

In operation, the input device data received from the user input devices via the console connectors 101 to 103, the hub 105 and host controller 106 are processed by the MCU 107. The MCU 107 either transfers the input device data to one of the device controllers 109-1 or 109-2, or transfers the input device data to the Bluetooth module 110, or performs other actions based on the input device data. The operation of the MCU 107 is described with reference to FIG. 3.

The MCU 107 constantly listens to the input device data received from the host controller 106 (step S301). The MCU 107 then determines whether the input device data is "hotkey" data, i.e. special pre-defined data sequences, or normal data (i.e. non-hotkey data) (step S302). Hotkeys are previously defined function keys or sequences of keystrokes that allow the user to issue commands to the KVM switch itself rather than to a connected computer or Bluetooth master machine. For example, a keystroke sequence "[pause] [pause] [enter]" may be defined as a port switch command. If the computer ports and the Bluetooth master machines are identified in the KVM switch system by natural numbers, then a keystroke sequence "[pause] [pause] n [enter]" may be defined as a port switch command to switch to port "n". In another example, a pre-defined function key or keystroke sequence may be a command to instruct the KVM switch to enter the OSD (on-screen display) mode.

If the input device data is hotkey data ("yes" in step S302), the MCU determines the command represented by the hotkey data (step S303). The MCU may perform one of the following functions based on the command corresponding to the hotkey data:

Switch to a selected Bluetooth master machine: The KVM switch 10 stores (in the storage unit 107A) link information of the Bluetooth master machines it has already paired with. The link information for each Bluetooth master machine may include, for example, a unique ID, address, etc., which is established during the pairing procedure between the Bluetooth master machine and the Bluetooth module 110 (the slave). The link information allows the KVM switch 10 to quickly switch to a Bluetooth master machine that already been paired with the KVM. The KVM switch can keep link information for up to 7 Bluetooth master machines. When the MCU 107 receives a command to switch to a selected Bluetooth master machine (i.e. a selection command that selects one of the Bluetooth master machines), it calls the stored link information (e.g. including the unique ID) of that Bluetooth master machine, and instructs the Bluetooth module 110 to communicate the user input device data to the selected Bluetooth master machine from now on (step S304). Note that switching of Bluetooth master machines does not require pairing each time a switch is performed, as long as the Bluetooth master machine to be switched to is already paired with the KVM switch. This enables quick switching among Bluetooth master machines and from a computer 30 to a Bluetooth master machine.

Bluetooth device pairing: If the user wishes to pair with a Bluetooth master machine that has not yet been paired with the KVM switch 10, the MCU 107 instructs the Bluetooth module 110 to perform a Bluetooth device pairing process with the Bluetooth master machine, and updates the link information for the Bluetooth master machines stored in the KVM switch 10 (step S305). The pairing is performed automatically, without intervention from the user.

Disconnect a paired Bluetooth master machine: If the user wishes to disconnect a Bluetooth master machine that has been paired with the KVM switch 10, the MCU instructs the Bluetooth module to disconnect the Bluetooth master machine and clears the link information of that Bluetooth master machine (step S306). Steps S304 to S306 are performed by the MCU in conjunction with the Bluetooth module 110. Here, it should be noted that the term "disconnect", when used in the context of Bluetooth communication, does not mean physical disconnection; rather, it is an un-pairing between Bluetooth devices.

Switch computer port: When the MCU 107 receives a command to switch to a selected computer (i.e. a selection command that selects one of the computers), it switches the console connectors 101-103 to a selected computer port, and instructs the video switch 108 to switch to the selected computer port (step S307). As a result, the input device data from the user console will be transmitted to the selected computer, and the video data from the selected computer will be transmitted to the user console. This port switch step may be similar to a port switch operation in a conventional KVM switch and is not described in detail here.

Call OSD menu: If the user wishes to interact with the KVM switch using OSD, the MCU enters the OSD mode (step S308). The MCU generates an OSD menu image and causes it to be displayed on the monitor of the user console via the video switch 108. The OSD-related functions is performed by an OSD module which may be a part of the MCU 107, or alternatively, as a separate module coupled to the MCU 107.

After performing steps S304 to S308, the MCU continues to listen to the input device data (step S301).

In step S302, if the input device data is not hotkey data ("no" in step S302), the MCU 107 determines which channel the data should be transmitted to (step S309). The channels include multiple (e.g. up to seven) Bluetooth channels, multiple (two in this example) computer channels, and the OSD channel. The determination is based on the commands previously received, such as in steps S304 (switch Bluetooth master machine), S307 (switch computer port) and S308 (OSD mode). Depending on the channel determined in step S309, the MCU sends the input device data to a selected Bluetooth master machine via the Bluetooth module 110 (step S310), or to a selected computer via the corresponding device controller 109-1 or 109-2 (step S311), or to the OSD module (step S312).

Note that in the case of the Bluetooth channels, the multiple channels are not different physical channels. Rather, the MCU 107 sends the user input device data to the Bluetooth module 110 and instructs the latter to communicate the data to the selected Bluetooth master machine. For example, the MCU 107 may send the ID of the selected Bluetooth master machine along with the user input device data. The Bluetooth module 110 communicates with multiple Bluetooth master machines using techniques provided by the Bluetooth technology, such as time division multiplexing.

When the console port is switched to a selected computer port, the video switch 108 connects the console video connector 104 to the video connector 112-1 or 112-2 of the selected computer port. When the console port is switched to a Bluetooth master machine, the user will typically use the Bluetooth master machine itself as the monitor. Thus, in this case, it is unimportant what video signal is connected to the console video connector 104.

In the OSD mode, the KVM switch displays an OSD menu on the monitor of the user console, and the user uses the mouse or touch screen display to communicate with the KVM switch. As the MCU transfers the input device data to the OSD module (step S312), the OSD module interprets the data and updates the OSD menu as appropriate. The user input in the OSD mode may constitutes the commands described earlier, including the Bluetooth switch command, Bluetooth device pairing or disconnect command, port switch command, etc., in which case the MCU 107 will perform the corresponding functions as in steps S304 to S307. It should be noted that the OSD feature is optional, and steps S308 and S312 may be omitted.

By using the KVM switch to convert console-side input device data into wireless device signals (e.g. Bluetooth), the KVM switch system of the first embodiment achieves many useful goals. First, the KVM switch system allows the user to use a common user console device such as a USB keyboard to control both conventional computers and Bluetooth master machines (such as tablet computers, handheld devices, notebook computers, desktop computer, game devices, etc.).

Second, the KVM switch 10 establishes link information for Bluetooth master machines that have already been paired, allowing the user to quickly switch to Bluetooth master machines. This is more convenient than using a conventional Bluetooth keyboard because current Bluetooth keyboards typically require pairing each time the keyboard is switches from one Bluetooth master machine to another Bluetooth master machine.

Third, the Bluetooth module can pair with up to seven Bluetooth master machines. Thus, with the Bluetooth mode, the KVM switch 10 can connect to an increased number of devices. For example, a 2-port KVM switch with embedded the Bluetooth module can control up to 2+7 devices.

Fourth, the KVM switch can use OSD, hotkey or special function key to perform pairing and switching for Bluetooth master machines, enhancing the convenience of switching among multiple devices.

Figure 4:
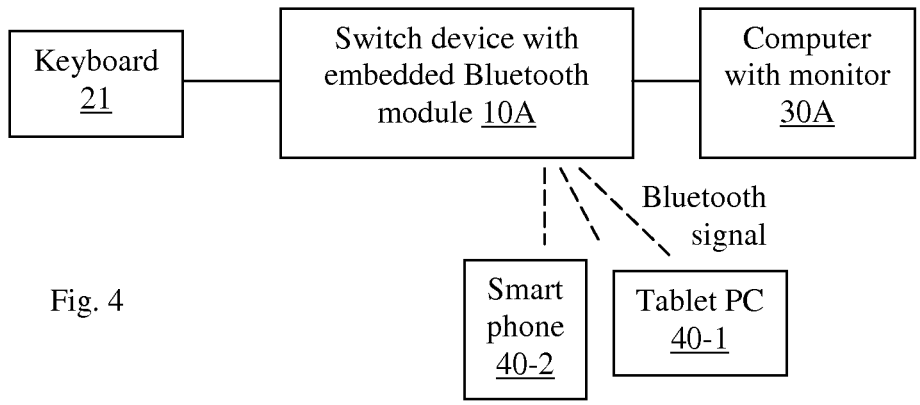
FIG. 4 illustrates a computer switch system according to a second embodiment of the present invention.

FIG. 4 illustrates a computer switch system according to a second embodiment of the present invention. The system includes a switch device 10A with an embedded Bluetooth module. The switch device 10A is preferably in the form of a dongle connected between a keyboard 21 and a computer 30A. The connections between the switch device 10A and the keyboard 21 may be PS/2 or USB connections. Alternatively, the switch device 10A may be connected to both the keyboard 21 and a mouse and the computer 30A.

The computer 30A is preferably a desktop or laptop computer with its own monitor. Thus, the user uses the keyboard 21 to interact with the computer 30A in a conventional way. However, by using the switch device 10A, the user can now use the same non-Bluetooth keyboard 21 to input keyboard data for Bluetooth master machines such as tablet computer 40-1, smart phone 40-2, etc.

Figure 5:
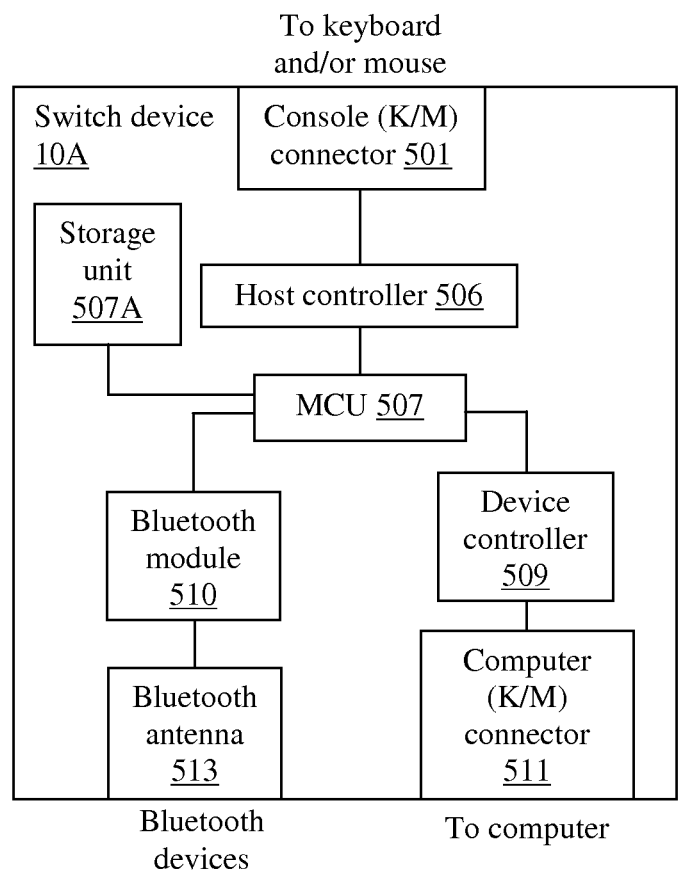
FIG. 5 is a block diagram illustrating a structure of the computer switch of the second embodiment.

FIG. 5 is a block diagram illustrating a structure of the switch device 10A of the second embodiment. The switch device 10A has a console keyboard/mouse connector 501, a host controller 506, a storage unit 507A, a Bluetooth module 510, a Bluetooth antenna 513, a device controller 509 and a computer keyboard/mouse connector 511, which are similar or identical to the corresponding components 101, 106, 107A, 110, 113, 109 and 111-1 of the KVM switch 10 shown in FIG. 2. Optionally, a console mouse connector may be provided, in which case a hub similar to hub 105 is also provided between the console keyboard and/or mouse connectors and the device controller 506. Unlike the KVM switch 10 of FIG. 2, the switch device 10A is connected to only one computer keyboard/mouse connector 511, and does not have any video connectors or a video switch.

The MCU 507 performs similar functions as the MCU 107 (see FIG. 3), and a full description is omitted here. For example, the MCU 507 sends the input device data to either the computer via the device controller 509, or to a selected Bluetooth master machine via the Bluetooth module 510.

The system of the second embodiment achieves similar advantages as the first embodiment.

To summarize, embodiments of the present invention provide apparatus and methods that allow users to use conventional (non-Bluetooth) keyboards for inputting text such as email, short messages, or perform text document editing on a Bluetooth master machine that does not have its own keyboard, making text input more convenient. It also allows the user to use the same conventional keyboard to control Bluetooth and non-Bluetooth computers with seamless switching among such computers.

The KVM switch 10 according to the first embodiment may have the form factor of a desk-top device, where the console connectors and computer connectors are formed on a body that houses the other components of the KVM switch 10 shown in FIG. 2. Alternatively, it may be in the form of a dongle having a body and multiple cables extending from the body. The distal ends of the cables are provided with connectors (101 to 104, 111 and 112) for connecting to the user console and/or computers. The cables may be permanently or removably attached to the body. If the cables are removable, the parts of the body that connect with the proximate ends of the cables may be considered the connectors. The switch device 10A may also be in the form of a desk-top device of dongle; from a practical standpoint it is more convenient as a dongle that has one cable for connecting to the computer, and one connector on the body to receive a cable from the keyboard.

Although the Bluetooth modules 110 and 510 in FIGS. 2 and 5 are shown as being an internal component of the KVM switch 10 and 10A, the Bluetooth modules may also be an external component to the KVM switch; for example, they may be in the form of a USB device inserted into a USB port of the KVM switch.

Although Bluetooth is described in the above embodiments, the invention is also applicable to other types of wireless communication technologies where the wireless devices form personal area networks, such as Ultra Wide Band (UWB), ZigBee, Near Field Communication (NFC), etc. Such wireless devices may be generally referred to as wireless personal area network (WPAN) devices. The Bluetooth module 110 may be replaced by the appropriate wireless communication modules for these devices. The Bluetooth antenna 113 may be replaced by other appropriate hardware, which may be generally referred to as a wireless interface.

It will be apparent to those skilled in the art that various modification and variations can be made in the computer switch systems and related methods of the present invention without departing from the spirit or scope of the invention. Thus, it is intended that the present invention cover modifications and variations that come within the scope of the appended claims and their equivalents.

What is claimed is:

1. A switch device for communications between a user console and one or more computers and one or more WPAN (wireless personal area network) master devices, the user console including one or more user input devices and a monitor, the switch device comprising:

a console interface for connecting to the user console, including a first input device connector for connecting to the user input devices of the user console and a first video connector for connecting to the monitor of the user console;

a computer interface including one or more computer ports for connecting to the one or more computers via non-wireless connections, respectively, each computer port including a second input device connector and a second video connector;

a wireless interface for wireless communication with the one or more WPAN master devices using a predefined wireless communication technology;

a controller coupled to the console interface, the computer interface and the wireless interface, wherein in response to a first selection command selecting one of the one or more computer ports, the controller transmits input device data from the first input device connector of the console interface to the second input device connector of a selected one of the one or more computer ports, whereby the input device data controls the computer connected to the selected computer port, and wherein in response to a second selection command selecting one of the one or more WPAN master devices, the controller converts input device data received from the first input device connector of the console interface into data compliant with the predefined wireless communication standard, and transmits the converted data to the WPAN master device via the wireless interface by acting as a slave of the WPAN master device according to the predefined wireless communication standard, whereby the input device data controls the selected one of the one or more WPAN master devices; and a video switch coupled to the computer interface and the console interface, wherein in response to the first selection command, the video switch transmits video data from the second video connector of the selected one of the one or more computer ports to the first video connector of the console interface, whereby video signals from the computer connected to the selected computer port is displayed on the monitor of the user console, and wherein the video switch transmits no video signal from the wireless interface to the first video connector of the console interface in response to the second selection command.

2. The switch device of claim 1, further comprising a storage unit coupled to the controller for storing pairing information and link information for the one or more WPAN master devices.

3. The switch device of claim 2, wherein the controller automatically performs paring with the one or more WPAN master devices using the stored paring information and link information.

4. The switch device of claim 1, further comprising:
a host controller coupled to the first input device connector of the console interface for controlling the input devices of the user console and for receiving the input device data from the input devices; and
one or more device controller connected to the second input device connectors of the one or more computer ports, respectively, for emulating one or more user input devices for the connected computers.

5. The switch device of claim 4, wherein the console interface includes two first input device connectors for connecting to a keyboard and a mouse of the user console, and
wherein the switch device further comprises a hub having an upstream end and at least two downstream ends, wherein the upstream end is coupled to the host controller, and the downstream ends are coupled to the two first input device connectors, whereby the host controller communicates with the keyboard and the mouse via the hub.

6. The switch device of claim 1, wherein the WPAN master devices are selected from the group consisting of tablet computers, smart phones, smart handheld devices, and video game consoles.

7. The switch device of claim 1, wherein the wireless interface includes a wireless communication module, which is selected from the group consisting of a Bluetooth module, a Ultra Wide Band module, a ZigBee module, and a Near Field Communication module.

8. The switch device of claim 1, further comprising:
a body for housing the controller; and
a plurality of cables extending from the body for electrically connecting to the one or more computers;
wherein each cable has a first end and a second end, the first end being permanently or removably connected to the body and electrically connected to the console interface, the controller, and the video switch, the second end being adapted for connecting to one of the computers.

9. The switch device of claim 1, wherein the first and second input device connectors are USB (Universal Serial Bus) connectors.

10. The switch device of claim 1, wherein the first and second selection commands are received by the controller from the user input device via the console interface.

11. A switch device for communications between a user input device and a computer and one or more WPAN (wireless personal area network) master devices, the switch device comprising:
a console interface including a first input device connector for connecting to the user input device;
a computer interface including a second input device connector for connecting to an input device connector of a computer;
a wireless interface for wireless communication with the one or more WPAN master devices using a predefined wireless communication technology; and
a controller coupled to the console interface, the computer interface and the wireless interface,
wherein in response to a first selection command selecting the computer interface, the controller transmits input device data from the first input device connector to the second input device connector, whereby the input device data controls the computer connected to the second input device connector, and
wherein in response to a second selection command selecting one of the one or more WPAN master devices, the controller converts input device data received from the first input device connector of the console interface into data compliant with the predefined wireless communication standard, and transmits the converted data to the WPAN master device via the wireless interface by acting as a slave of the WPAN master device according to the predefined wireless communication standard, whereby the input device data controls the selected one of the one or more WPAN master devices.

12. The switch device of claim 11, further comprising a storage unit coupled to the controller for storing pairing information and link information for the one or more WPAN master devices.

13. The switch device of claim 12, wherein the controller automatically performs paring with the one or more WPAN master devices using the stored paring information and link information.

14. The switch device of claim 11, further comprising:
a host controller coupled to the first input device connector of the console interface for controlling the input devices of the user console and for receiving the input device data from the input devices; and
a device controller connected to the second input device connector of the computer interface for emulating a user input device for the connected computer.

15. The switch device of claim 11, wherein the WPAN master devices are selected from the group consisting of tablet computers, smart phones, smart handheld devices, and video game consoles.

16. The switch device of claim 11, wherein the wireless interface includes a wireless communication module, which is selected from the group consisting of a Bluetooth module, a Ultra Wide Band module, a ZigBee module, and a Near Field Communication module.

17. The switch device of claim 11, further comprising:
a body for housing the controller; and
a cable extending from the body for electrically connecting to the computer;
wherein the cable has a first end and a second end, the first end being permanently or removably connected to the body and electrically connected to the console interface and the controller, the second end being adapted for connecting to the computer.

18. The switch device of claim 11, wherein the first and second input device connectors are USB (Universal Serial Bus) connectors.

19. The switch device of claim 11, wherein the first and second selection commands are received by the controller from the user input device via the console interface.

20. A method for sharing a user input device of a user console among one or more computers and one or more WPAN (wireless personal area network) master devices, comprising:
providing a switch device having a console interface, a computer interface including one or more computer ports, and a wireless interface for wireless communication with the one or more WPAN master devices using a predefined wireless communication technology;
connecting the user input device to the first input device connector of the switch device;
connecting the one or more computers to the one or more computer ports of the switch device, respectively;
pairing the switch device with the one or more WPAN master devices;

in response to a first selection command selecting one of the one or more computer ports, the switch device transmitting input device data from the console interface to the selected one of the one or more computer ports, whereby the input device data controls the computer connected to the selected computer port; and in response to a second selection command selecting one of the one or more WPAN master devices, the switch device converting input device data received from the console interface into data compliant with the predefined wireless communication standard, and transmitting the converted data to the WPAN master device via the wireless interface by acting as a slave of the WPAN master device according to the predefined wireless communication standard, whereby the input device data controls the selected one of the one or more WPAN master devices.

21. The method of claim 20, wherein the switch device automatically performs paring with the one or more WPAN master devices using stored paring information and link information of the one or more WPAN master devices.

22. The method of claim 20, wherein the WPAN master devices are Bluetooth master machines, and wherein the console interface and the computer interface use USB (Universal Serial Bus) connections.

23. The method device of claim 20, further comprising receiving the first and second selection commands by the switch device from the user input device via the console interface.

* * * * *